United States Patent
Kim et al.

(10) Patent No.: US 8,611,111 B2
(45) Date of Patent: Dec. 17, 2013

(54) RESONANCE POWER GENERATOR

(75) Inventors: Nam Yun Kim, Seoul (KR); Young Tack Hong, Seongnam-si (KR); Sang Wook Kwon, Seongnam-si (KR); Eun Seok Park, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 12/966,033

(22) Filed: Dec. 13, 2010

(65) Prior Publication Data

US 2011/0141772 A1 Jun. 16, 2011

(30) Foreign Application Priority Data

Dec. 14, 2009 (KR) .......................... 10-2009-124271

(51) Int. Cl.
*H02M 5/40* (2006.01)
*H02M 7/42* (2006.01)

(52) U.S. Cl.
USPC ................................. 363/34; 363/40; 363/95

(58) Field of Classification Search
USPC ........... 307/104, 149; 363/178, 34, 39, 40, 95
See application file for complete search history.

(56) References Cited

U.S. PATENT DOCUMENTS

| | | | | |
|---|---|---|---|---|
| 7,844,233 B2* | 11/2010 | Vaisanen | .................... | 455/127.1 |
| 8,260,199 B2* | 9/2012 | Kowalski | ..................... | 455/41.1 |
| 8,278,784 B2* | 10/2012 | Cook et al. | ..................... | 307/149 |
| 8,304,935 B2* | 11/2012 | Karalis et al. | ................. | 307/104 |
| 2007/0149162 A1 | 6/2007 | Greene et al. | | |
| 2008/0197802 A1* | 8/2008 | Onishi et al. | .................. | 320/106 |
| 2009/0152954 A1* | 6/2009 | Le et al. | ........................ | 307/110 |
| 2009/0284245 A1* | 11/2009 | Kirby et al. | ................... | 323/318 |
| 2010/0141042 A1* | 6/2010 | Kesler et al. | .................. | 307/104 |

FOREIGN PATENT DOCUMENTS

| | | |
|---|---|---|
| JP | 2008-125142 | 5/2008 |
| JP | 2008-263710 | 10/2008 |
| KR | 10-2003-0018028 | 3/2003 |
| KR | 10-2008-0038683 | 5/2008 |

* cited by examiner

*Primary Examiner* — Gary L Laxton
(74) *Attorney, Agent, or Firm* — NSIP Law

(57) ABSTRACT

A resonance power generator is provided. The resonance power generator includes an alternating current/direct current (AC/DC) rectifier to rectify an input signal of an alternating voltage and an AC generator to generate an AC signal based on the rectified signal that is output from the AC/DC rectifier. The resonance power generator may also include, for example, a control unit to control a frequency of the AC signal, a filter unit to remove a spurious signal or a harmonic element included in the AC signal, a voltage/current amplifier to amplify the AC signal, and a source resonator to transmit a power to a target resonator.

13 Claims, 5 Drawing Sheets

RESONANCE POWER GENERATOR

CROSS-REFERENCE TO RELATED APPLICATION(S)

This application claims the benefit under 35 U.S.C. §119(a) of Korean Patent Application No. 10-2009-0124271, filed on Dec. 14, 2009, in the Korean Intellectual Property Office, the entire disclosure of which is incorporated herein by reference for all purposes.

BACKGROUND

1. Field

The following description relates to a resonance power generator, and more particularly, to a resonance power generator that may minimize loss caused by an active element such as a radio frequency (RF) power amplifier in the resonance power generator.

2. Description of Related Art

As information technology (IT) develops, various portable electronic devices have been released and propagated. The battery performance of these portable electronic devices is an important issue. Besides portable electronic devices, home appliances may be provided with a function of wirelessly transmitting data. For the most part though, power is supplied to the home appliances through a power line.

Recently, a scheme for a wireless power transmission to wirelessly supply power is has been studied. A resonance power generator may use an active element such as a RF power amplifier, and the like, to boost power that is wirelessly transmitted through a source resonator. The active element may be power consuming. This increase in power consumption at an end of a wireless power transmitter may deteriorate power efficiency in the overall system.

SUMMARY

In one general aspect, there is provided a resonance power generator comprising an alternating current/direct current (AC/DC) rectifier to rectify an input signal of an alternating voltage, an AC generator to generate an AC signal using the rectified signal output from the AC/DC rectifier, a control unit to control a frequency of the AC signal, a filter unit to remove a spurious signal or a harmonic element included in the AC signal, a voltage/current amplifier to amplify the AC signal, and a source resonator to transmit power to a target resonator.

The resonance power generator may further comprise a voltage/current controller to receive the rectified signal output from the AC/DC rectifier, and to control an amount of the power transmitted to the target resonator, wherein the AC generator generates the AC signal based on an output signal of the voltage/current controller.

The AC generator may comprise a switching circuit unit, and the control unit may control a switching frequency of the switching circuit unit.

The AC generator may comprise an oscillator, and the control unit may control an oscillating frequency of the oscillator.

The oscillator may comprise a pulse sharpener to sharpen a generated oscillation signal.

The resonance power generator may further comprise an AC frequency tuning unit to tune the frequency of the AC signal.

The resonance power generator may further comprise a feedback control and protection circuit to detect a detection value that comprises at least one of the frequency of the AC signal having passed through the AC/DC rectifier, a phase of the AC signal, and an amount of the power of the AC signal, wherein the AC frequency tuning unit receives feedback of the detection value to tune the frequency of the AC signal.

The feedback control and protection circuit may receive, from the control unit, information about the AC signal generated by the AC generator, and the information about the AC signal may be transmitted to the AC frequency tuning unit.

In another aspect, there is provided a resonance power generator, comprising an alternating current/direct current (AC/DC) rectifier to rectify an input signal of an alternating voltage, an AC generator to generate an AC signal using the rectified signal output from the AC/DC rectifier, and a source resonator to transmit power to a target resonator based on the generated AC signal.

The AC generator may comprise a switching circuit unit, and a frequency of the AC signal output from the AC generator may be determined based on the switching frequency of the switching circuit unit.

The AC generator may comprise an oscillator, and a frequency of the AC signal that is output from the AC generator may be determined based on the oscillating frequency of the oscillator.

The resonance power generator may further comprise a voltage/current controller to receive the rectified signal output from the AC/DC rectifier, and to control an amount of the power transmitted to the target resonator, wherein the AC generator receives an output signal of the voltage/current controller and generates the AC signal based on an output signal.

The resonance power generator may further comprise a feedback control and protection circuit to detect feedback information that comprises at least one of the frequency of the AC signal having passed through the AC/DC rectifier, a phase of the AC signal, and an amount of the power of the AC signal, an AC frequency tuning unit to tune the frequency of the AC signal, based on the detected feedback information, and a filter unit to remove a spurious signal or a harmonic element included in the AC signal, based on the detected feedback information.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

As described herein, for example, the source or transmitter may be, or may be included in, a terminal, such as a mobile terminal, a personal computer, a personal digital assistant (PDA), an MP3 player, and the like. As another example, the target or receiver described herein may be, or may be included in, a terminal, such as a mobile terminal, a personal computer, a personal digital assistant (PDA), an MP3 player, and the like. As another example, the transmitter and/or the receiver may be a separate individual unit.

Figure 1:
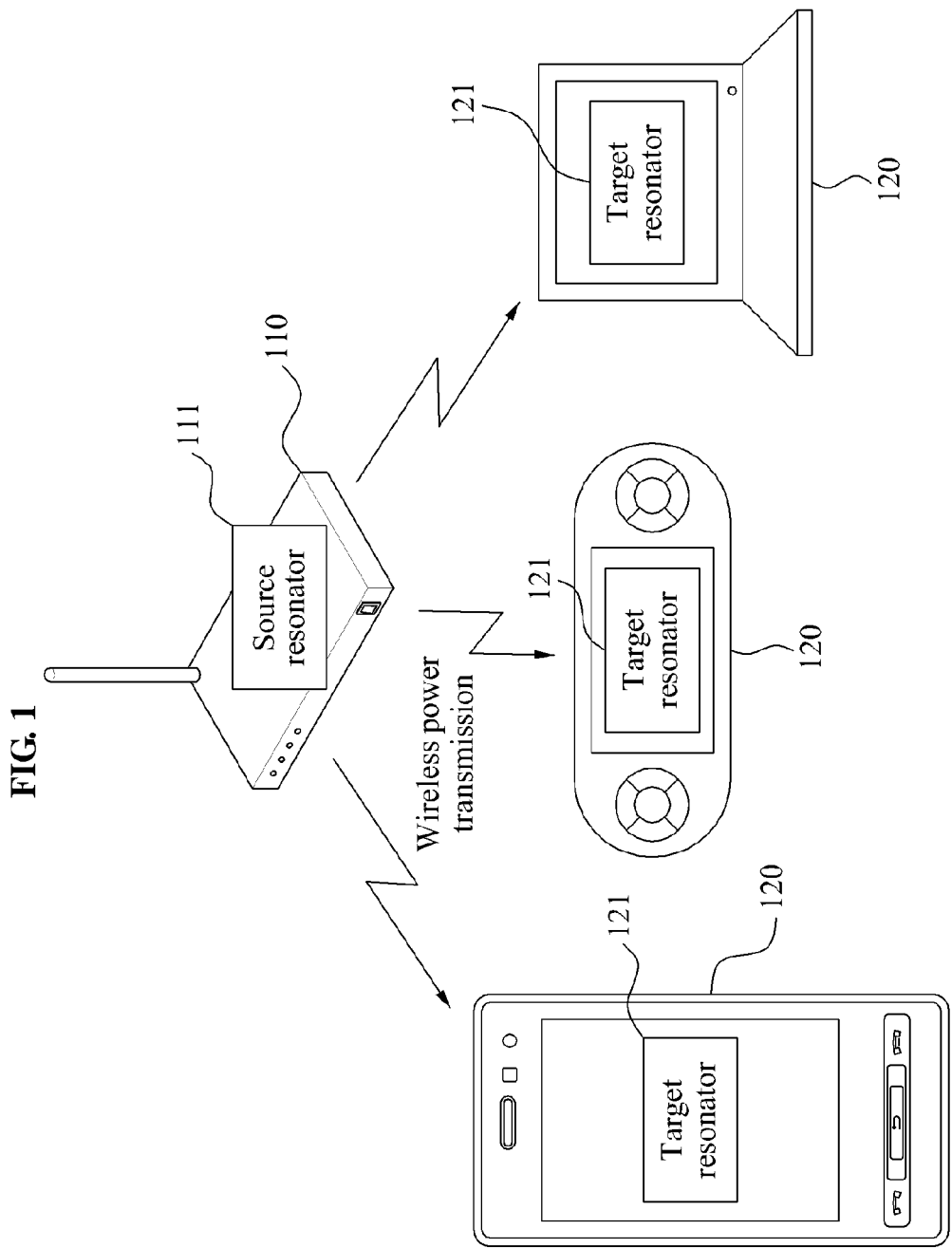
FIG. 1 is a diagram illustrating an example of an environment in which a resonance power generator is applied.

FIG. 1 illustrates an example of an environment in which a resonance power generator is applied.

Referring to FIG. 1, resonance power generator 110 may wirelessly transmit power to one or more target devices 120. In this example, the resonance power generator 110 includes a source resonator 111, and the target device 120 includes a target resonator 121. As an example, the resonance power generator 110 may be incorporated in a portable terminal in a module type.

Figure 2:
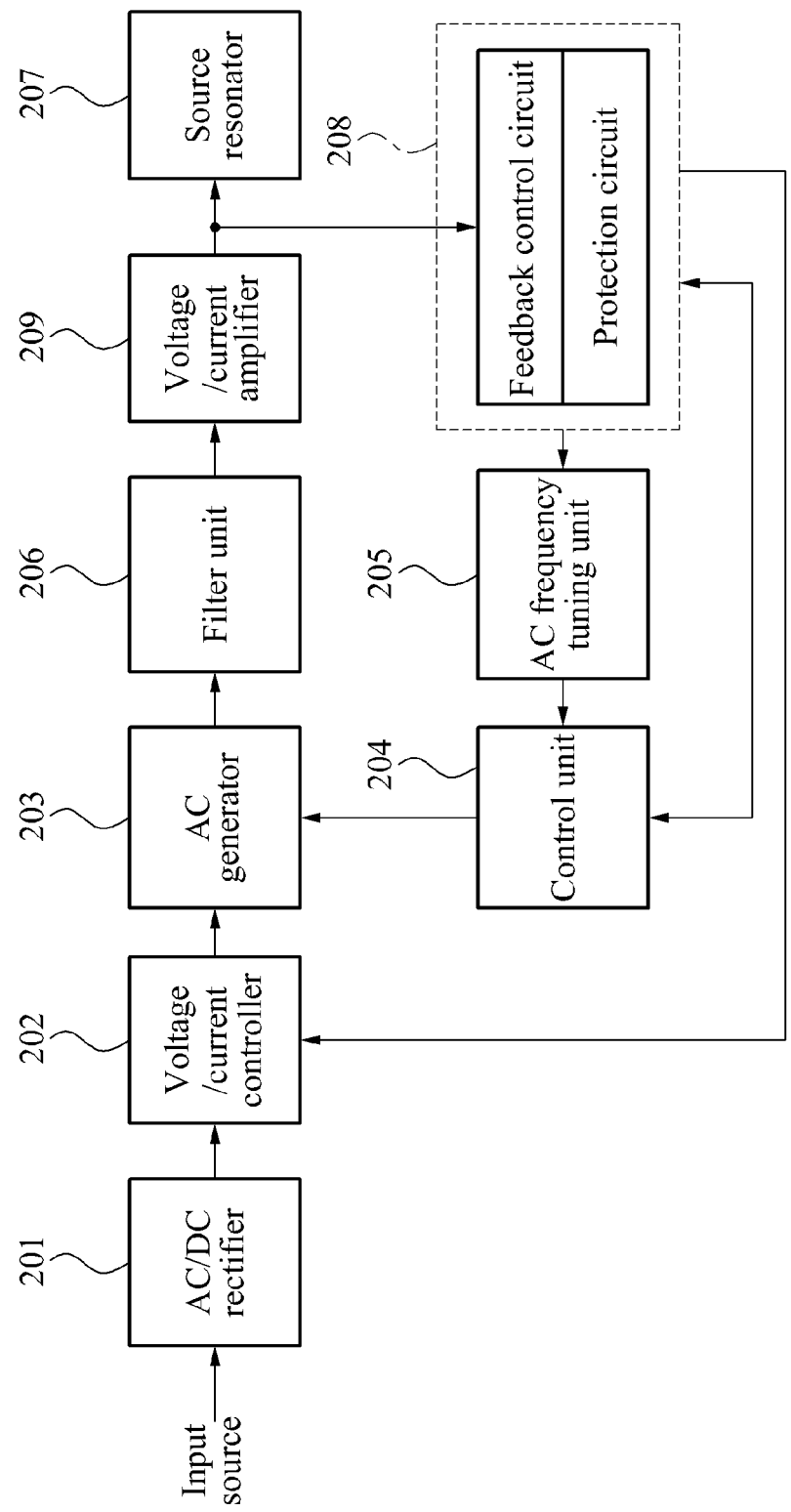
FIG. 2 is a diagram illustrating an example of a resonance power generator.

FIG. 2 illustrates an example of a resonance power generator.

In this example, the resonance power generator includes an alternating current/direct current (AC/DC) rectifier 201, an AC generator 203, a control unit 204, a filter unit 206, a voltage/current amplifier 209, and a source resonator 207. According to the example illustrated in FIG. 2, the resonance power generator may further include a voltage/current controller 202, an AC frequency tuning unit 205, and/or a feedback control and protection circuit 208.

The AC/DC rectifier 201 may rectify an input signal of an alternating voltage to a DC signal, for example, an input signal of 60 Hz and 85 to 256 volts, to a DC signal.

The voltage/current controller 202 may control a voltage/current in order to control the amount of power transmitted to a target resonator. A control signal that controls the voltage/current in the voltage/current controller 202 may be a signal fed back from the target resonator, and may be an input signal of a user. When more consumption power is desired at the target resonator, a signal may be fed back to the resonance power generator, and the fed back signal may function as a control signal of the voltage/current controller 202 to request the amount of transmitted power to be increased.

For example, the AC generator 203 may generate a carrier wave that has a predetermined frequency that is used for power transmission, based on the control of the control unit 204. A frequency of an AC signal generated by the AC generator 203 may be determined based on the control of the control unit 204. For example, the AC generator 203 may employ one or more various schemes. Examples of two schemes of the AC generator 203 are described herein, however, it should be appreciated that the AC generator 203 is not limited thereto.

Figure 3:
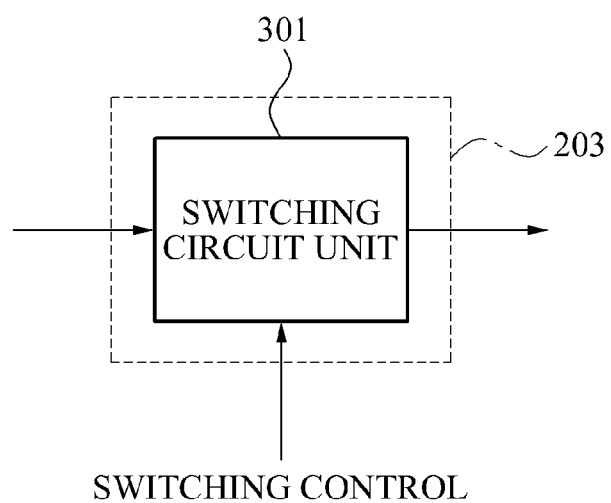
FIG. 3 is a diagram illustrating an example of an alternating current (AC) generator of a resonance power generator.

(1) Switching Scheme:

FIG. 3 illustrates an example of an AC generator of a resonance power generator.

Referring to the example of FIG. 3, AC generator 203 includes a switching circuit unit 301. The switching circuit unit 301 may operate by a switching frequency controlled by the control unit 204. For example, a frequency of an AC signal outputted from the AC generator 203 may be determined based on the switching frequency of the switching circuit unit 301. As an example, the switching circuit unit 301 may be a fast switching element, and may include a field effect transistor (FET). An example of an output waveform of the AC generator 203 using the switching circuit unit 301 is illustrated in FIG. 5.

Figure 5:
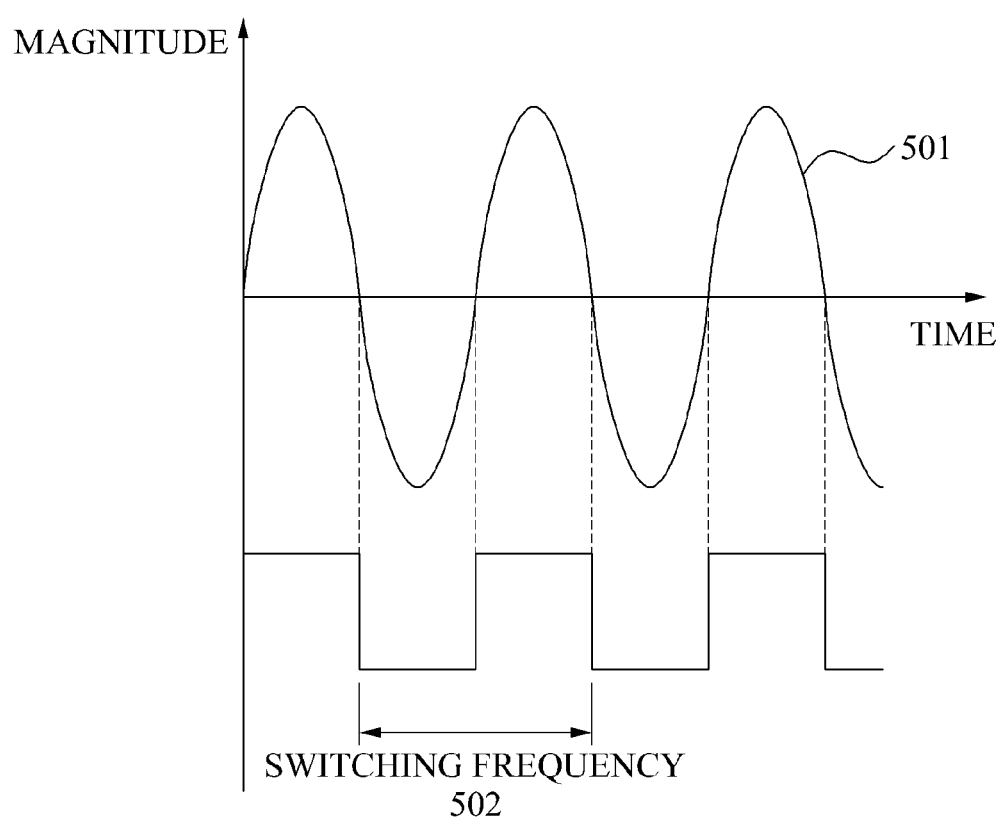
FIG. 5 is a diagram illustrating an example of an output waveform of an AC to generator of a resonance power generator.

FIG. 5 illustrates an example of an output waveform of an AC generator of a resonance power generator. The output waveform 501 of a switching circuit unit 301 may be generated by a switching signal that has a predetermined switching frequency 502. For example, the predetermined switching frequency 502 may be generated based on the control of a control unit 204.

Figure 4:
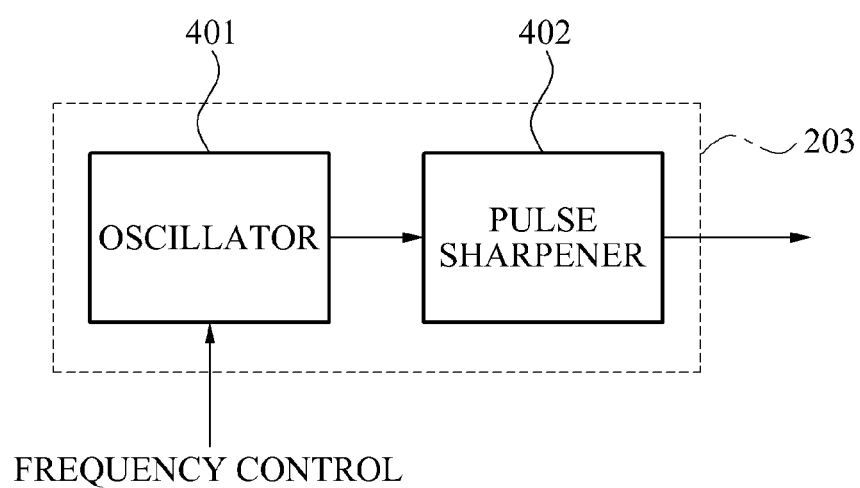
FIG. 4 is a diagram illustrating another example of an AC generator of a resonance power generator.

(2) Oscillation Scheme:

FIG. 4 illustrates another example of an AC generator of a resonance power generator.

Referring to the example of FIG. 4, AC generator 203 includes an oscillator 401 and a pulse sharpener 402. The oscillator 401 may output an AC signal having a predetermined oscillating frequency based on a control of the control unit 204. The pulse sharpener 402 may sharpen the AC signal generated by the oscillator 401. For example, a frequency of the AC signal that is output from the AC generator 203 may be determined based on the oscillating frequency of the oscillator 401.

For example, the control unit 204 may control the switching frequency of the switching circuit unit 301 of FIG. 3, as described above in a "(1) Switching scheme." As another example, the control unit 204 may control the oscillating frequency of the oscillator 401 of FIG. 4, as described above in an "(2) Oscillation scheme."

Referring again to FIG. 2, information about the power that is output from the source resonator 207 may be transferred to a feedback control and protection circuit 208. The power Information may include, for example, an amount of power, a frequency, a phase, and the like.

The filter unit 206 may remove a spurious signal or a harmonic element included in the AC signal generated by the AC generator 203. For example, the filter unit 206 may include one or more of a low-pass filter, a high-pass filter, a band-pass filter, and an image filter.

The voltage/current amplifier 209 may amplify a voltage component and/or a current component of the AC signal that passes through the filter unit 206. For example, the voltage/current amplifier 209 may include a passive element such as a coil, a transformer, and the like, instead of an active element such as a commonly used RF power amplifier.

The feedback control and protection circuit 208 may include at least one of a frequency detector, a phase detector, and a power detector. For example, the feedback control and protection circuit 208 may detect at least one of an amount of output power, a frequency, and a phase of the source resonator, and transfer the detected value to the AC frequency tuning unit 205.

As described above, the feedback control and protection circuit 208 may receive, from the control unit 204, information about the output power, and may transfer, to the AC frequency tuning unit 205, the information received from the control unit 204. Influence caused by a change in output frequency may occur due to an external environment, or may occur in an initial setting stage. When operating the resonance power generator, the feedback control and protection circuit 208 may minimize the influence of a change in the output frequency, a change in the amount of the output power, and a change in the phase, and may generate the frequency in a stable manner.

The feedback control and protection circuit 208 may detect an amount of change in power of the AC signal that passes through the voltage/current amplifier 209, and may feed back a value of the detected amount to the voltage/current controller 202. Accordingly, the feedback control and protection circuit 208 may operate to increase or decrease the amount of output power.

The AC frequency tuning unit 205 may receive information fed back from the feedback control and protection circuit 208. For example, the AC frequency tuning unit 205 may receive information about the detected value of the feedback control and protection circuit 208 and information about the output power provided from the control unit 204. The AC frequency tuning unit 205 may make the frequency and the power of the AC signal outputted from the AC generator 203 compensated by the control unit 204, based on the feedback information. As another example, the filter unit may filter the AC signal based on the feedback information.

The source resonator 207 may transmit the power to a target resonator (not shown) using the AC signal that passes through the filter unit 206.

In the case of a system including the RF power amplifier, an additional RF device may be included. As a result, power consumption may increase and a size of the entire system may increase.

Accordingly, as described herein, a resonance power generator may be used to minimize a loss that occurs due to an active element such as a power amplifier in the resonance power generator.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such to as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance power generator comprising:
an alternating current/direct current (AC/DC) rectifier configured to rectify an input signal of an alternating voltage;
an AC generator configured to generate an AC signal using the rectified signal output from the AC/DC rectifier;
a control unit configured to control a frequency of the AC signal;
a filter unit configured to remove a spurious signal or a harmonic element included in the frequency-controlled AC signal;
a passive voltage/current amplifier configured to passively amplify the filtered AC signal;
a feedback loop configured to receive an output of the passive voltage/current amplifier, to detect an amount of change in a value of the AC signal that passes through the passive voltage/current amplifier, and to feed back the value of the detected amount of change to the control unit, wherein the control unit compensates the AC signal input to the passive voltage/current amplifier based on the value of the amount of change; and
a source resonator configured to transmit power derived from the passively amplified AC signal to a target resonator.

2. The resonance power generator of claim 1, further comprising:
a voltage/current controller configured to receive the rectified signal output from the AC/DC rectifier, and to control an amount of the power transmitted to the target resonator, wherein
the AC generator generates the AC signal based on an output signal of the voltage/current controller.

3. The resonance power generator of claim 1, wherein:
the AC generator comprises a switching circuit unit, and
the control unit controls a switching frequency of the switching circuit unit.

4. The resonance power generator of claim 1, wherein:
the AC generator comprises an oscillator, and
the control unit controls an oscillating frequency of the oscillator.

5. The resonance power generator of claim 4, wherein the oscillator comprises a pulse sharpener to sharpen a generated oscillation signal.

6. The resonance power generator of claim 1, further comprising:
an AC frequency tuning unit configured to tune the frequency of the AC signal.

7. The resonance power generator of claim 6, wherein:
the feedback loop detects a value of at least one of the frequency of the AC signal having passed through the AC/DC rectifier, a phase of the AC signal, and an amount of the power of the AC signal, and
the AC frequency tuning unit receives feedback of the detected value to tune the frequency of the AC signal.

8. The resonance power generator of claim 7, wherein:
the feedback control and protection circuit receives, from the control unit, information about the AC signal generated by the AC generator, and
the information about the AC signal is transmitted to the AC frequency tuning unit.

9. A resonance power generator, comprising:
an alternating current/direct current (AC/DC) rectifier configured to rectify an input signal of an alternating voltage;
an AC generator configured to generate an AC signal using the rectified signal output from the AC/DC rectifier;
a passive voltage/current amplifier configured to passively amplify the AC signal;
a feedback loop configured to receive an output of the passive voltage/current amplifier, to detect an amount of change of a value of the AC signal that passes through the passively amplified by the passive voltage/current amplifier, and to feed back the value of the detected amount of change;
a control unit to compensate the AC signal output by the AC generator and input to the passive voltage/current amplifier based on the value of the amount of change; and
a source resonator configured to transmit power derived from the passively amplified AC signal to a target resonator.

10. The resonance power generator of claim 9, wherein the AC generator comprises a switching circuit unit, and a frequency of the AC signal output from the AC generator is determined based on the switching frequency of the switching circuit unit.

11. The resonance power generator of claim 9, wherein the AC generator comprises an oscillator, and a frequency of the AC signal that is output from the AC generator is determined based on the oscillating frequency of the oscillator.

12. The resonance power generator of claim 9, further comprising:
a voltage/current controller configured to receive the rectified signal output from the AC/DC rectifier, and to control an amount of the power transmitted to the target resonator, wherein
the AC generator receives an output signal of the voltage/current controller and generates the AC signal based on the output signal.

13. The resonance power generator of claim 9,
wherein the feedback loop detects a value of at least one of the frequency of the AC signal having passed through the AC/DC rectifier, a phase of the AC signal, and an amount of the power of the AC signal, and the resonance power generator further comprises:
an AC frequency tuning unit configured to tune the frequency of the AC signal, based on the detected feedback information; and
a filter unit configured to remove a spurious signal or a harmonic element included in the AC signal, based on the detected feedback information.

* * * * *